May 2, 1939. H. K. WEIHE 2,156,415
BRAKE SYSTEM
Filed June 30, 1936 3 Sheets-Sheet 1

Inventor.
Hermann Kurt Weihe

May 2, 1939.  H. K. WEIHE  2,156,415
BRAKE SYSTEM
Filed June 30, 1936   3 Sheets-Sheet 2

Inventor.

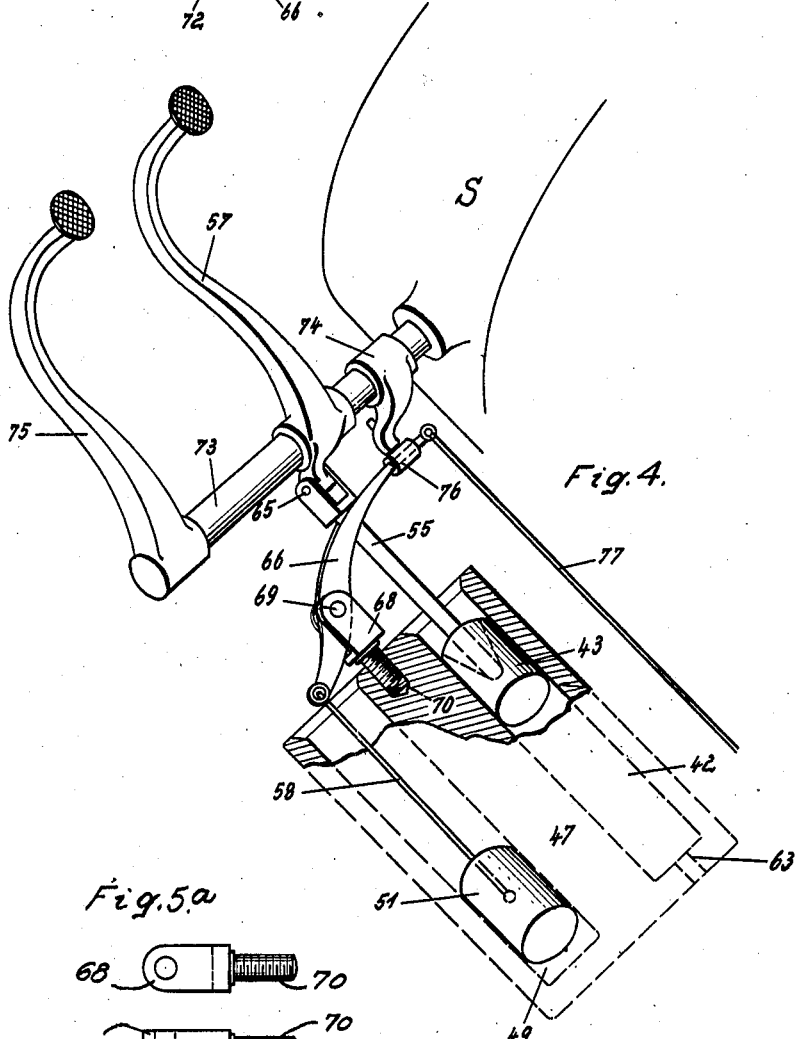

Patented May 2, 1939

2,156,415

UNITED STATES PATENT OFFICE 2,156,415

BRAKE SYSTEM

Hermann Kurt Weihe, Berlin, Germany

Application June 30, 1936, Serial No. 88,202
In Germany July 1, 1935

6 Claims. (Cl. 188—152)

The invention relates to a hydraulic brake system, more particularly for automobiles. In such hydraulic systems it is very important that no air should be able to enter the fluid circuit. Any noticeable accumulation of air in the active part of the brake system is known to produce, when the brakes are applied, a strong buffer action, which has an unfavourable effect on the development of the necessary brake pressure, so that reliable operation of the brakes becomes doubtful, which in some circumstances may have disastrous results. In order that no air may enter the brake system it is necessary to take care that the initial pressure in the circuit, which is adjusted to a definite value, should always be maintained. When the piston in the main brake cylinder returns to the position of rest (original position), no reduced pressure should occur in the main cylinder, but this may easily happen if the piston in the main cylinder moves back more quickly than the brake fluid can flow back out of the wheel brake cylinders and the pressure pipes. At the high pressure which is developed in applying the brakes it is necessary to allow for small leakage losses, which result in a reduction of the originally adjusted initial pressure in the circuit. Care must therefore be taken that any loss in fluid in the circuit should be immediately compensated.

The invention has the object of producing a refilling device for a hydraulic brake, which, in a completely satisfactory and reliable manner, ensures that any loss of fluid, after each braking operation and also while the brake is in the state of rest, shall be immediately compensated. According to the invention the refilling device of the hydraulic brake consists of a positively driven auxiliary pump which, during the whole braking operation, draws from the reservoir a definite excess quantity of fluid, which, when the pressure piston of the main cylinder returns to the state of rest for brakes in the off position, is forced by the auxiliary pump into the brake circuit, the amount of liquid above that required for refilling passing back to the reservoir through a return flow aperture. By means of such an arrangement the whole brake pressure system is kept constantly filled with the necessary quantity of liquid, so that the occurrence of a reduced pressure in the brake system is reliably prevented. In other words, the predetermined initial pressure in the whole brake system in the off position remains constantly at the same value. The entry of air into the system is thereby completely impossible, so that a proper working of the brake is at all times ensured.

Various constructional forms are possible for carrying the invention into effect. Further details of the invention are described together with these, as will be seen from the following description.

In the accompanying drawings four constructional examples of the invention are illustrated diagrammatically.

Fig. 4 shows the third constructional example of the new brake system in perspective;

Fig. 5a shows the holder for the driving member of the auxiliary pump in plan;

Figure 5b shows the same holder as in Fig. 5a in side elevation;

Figs. 6 and 7 show a constructive detail of the invention.

Figure 1:
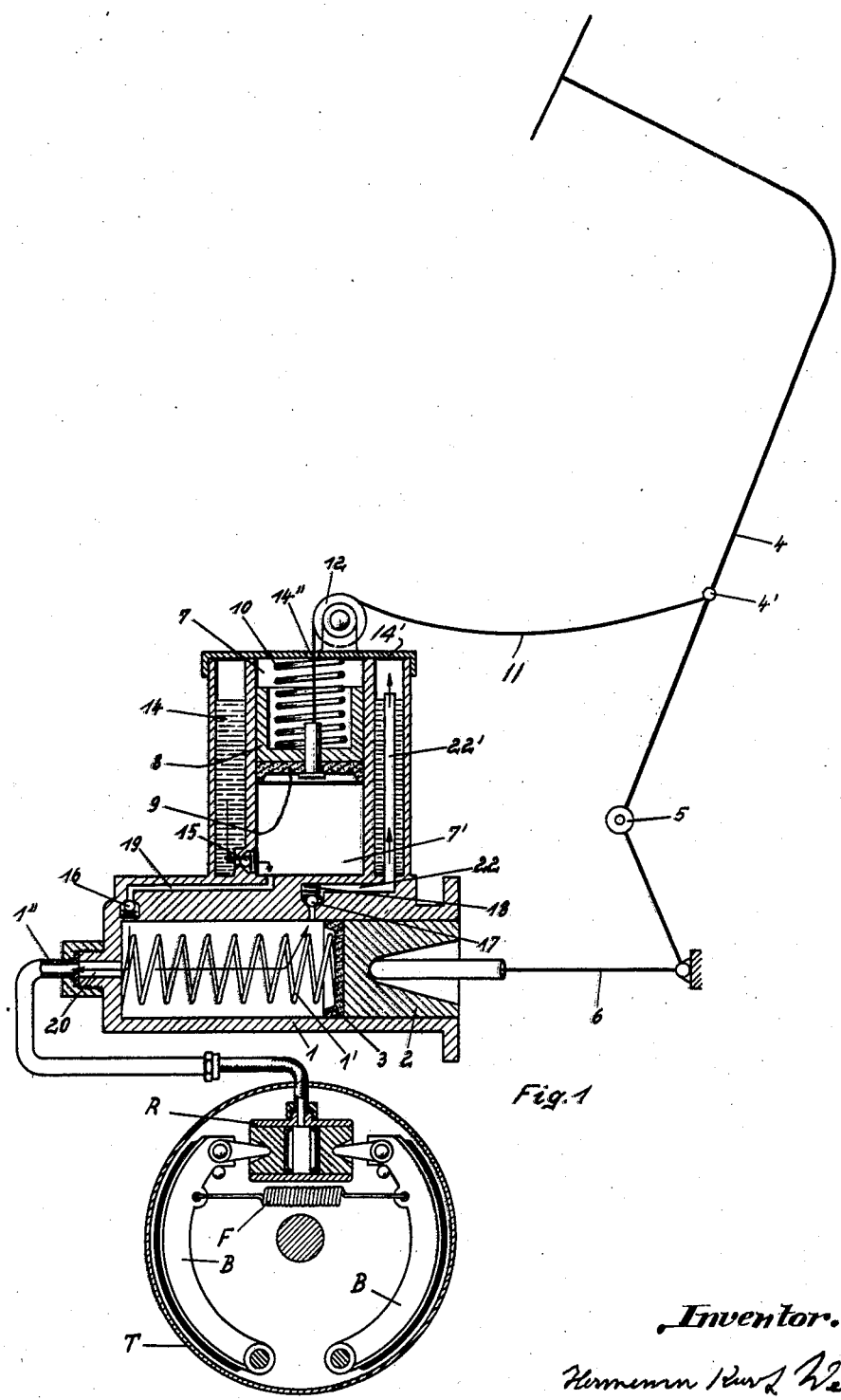
Fig. 1 is a side elevation of the brake system with an auxiliary pump arranged at right angles to the main brake cylinder in section.

In the construction according to Fig. 1, 1 is the main cylinder of the brake system with the pressure piston 2 reciprocating therein, which, at the end nearer the pressure space of the cylinder has a packing sleeve 3 consisting of flexible soft material, for example, rubber, which is pressed by the piston return spring 1' against the end of the piston 2. The piston 2 is driven by the pedal 4 pivoted at the point 5 which, at its lower end, is pivoted to the thrust rod 6, the front rounded end of which engages in a deep pocket on the back of the piston 2. At the outlet port 20 of the cylinder is attached the pressure conduit 1'' which leads in the usual manner to the wheel brake cylinders R of the vehicle, only one of which is illustrated for the sake of simplicity. With the main cylinder 1 a second cylinder 7 is connected, which is arranged at right angles to the main cylinder and is preferably cast in one piece therewith. In this additional cylinder 7 is the slidable piston 8, which on its pressure side also has a packing sleeve 9. The piston 8 is acted upon by a compression spring 10 which engages the end of the piston. At the centre of the end of the piston is attached a tension cord 11 which is guided over a pulley 12 and is connected with the pedal 4 at the point 4'. The auxiliary or refilling cylinder 7 is surrounded concentrically by the fluid reservoir 14, which is closed at the top by means of the removable cover 14' having in the centre a hole 14''. Between the reservoir 14 and the pressure space 7' of the cylinder 7 there is provided a suction valve, for example a non-return ball valve 15, which is preferably arranged near the end of the pressure space 7', as is shown in Fig. 1. The pressure space 7' is further in communication with the pressure space of the main cylinder 1 through a conduit 19 passing lengthways through the wall of the main cylinder 1. In this conduit is provided a pressure valve 16 in the form of a spring loaded ball valve. The conduit 19 opens at the outer end near to the outflow opening 20 in the main cylinder 1. Immediately in front of the packing sleeve 3 a conduit (overflow conduit) 22 provided in the wall of the cylinder 1, branches off, to which is connected a rising tube 22' opening near the highest point of the reservoir 14. In the conduit 22, which communicates with the reservoir through the rising tube, there is provided a regulating member (overflow valve) 17, which determines the initial pressure in the main cylinder and may be in the form of a pressure valve which is loaded by the spring 18, the tension of which is adjusted to the value of the initial pressure in the brake system. The closing force of this valve is somewhat weaker than the return springs F of the brake blocks B of all the wheels.

The brake device illustrated in Fig. 1 acts as follows:

In the off position of the brake system the various parts take up the positions shown in Fig. 1. If the pedal 4 is depressed the piston 2 is moved forwards in the cylinder 1 by the thrust rod 6, that is in the direction of the outlet 20. The pressure thus exerted on the fluid in the cylinder is transmitted through the conduit 1'' to the wheel brake cylinders R, so that the brake blocks B are forced against the brake drum T of each wheel. The opening of the return conduit 22 which, in the brake off position is immediately in front of the packing sleeve 3, is covered during the forward movement of the piston 2, first, by the edge of the sleeve 3 and then by the piston itself, so that no fluid can be forced out of the cylinder through this conduit. The spring loaded valve 16 is additionally forced against its seating by the fluid pressure in the cylinder 1 so that also the conduit 19, between the pressure space 7' of the auxiliary pump and the cylinder 1, is closed. While the piston 2 is pressed forwards in the cylinder the piston 8, in the cylinder 7, is drawn back by the cord 11, attached to the pedal 4, against the pressure of the spring 10 so as to enlarge the working space 7'. As a result, fluid is drawn from the reservoir 14, through the valve 15, into the space 7' in front of the piston 8 of the pump.

As soon as the brake pedal 4 is released, that is, returns to its initial position, the spring 10, which was compressed when the piston 8 was moved by the cord 11, forces the piston 8 back to its initial position, as shown in Fig. 1. The fluid in front of the piston 8 of the pump is then forced through the conduit 19 and the non-return valve 16 into the main cylinder 1. On account of the flow of fluid into the pressure space of the cylinder 1 the quantity of fluid, which may have been lost during the braking operation, is immediately replaced, so that the pressure in the brake system can never drop below the value of the necessary initial pressure. The excess quantity of fluid which flows into the pressure space of the cylinder 1 under pressure is forced through the overflow valve 17, which opens when the initial pressure is exceeded, into the return conduit 22 and further, into the rising tube 22', from which this fluid finally flows into the reservoir 14.

The flow of the fluid is indicated by arrows in Fig. 1 so as to make the process more readily understood.

The process described shows that every loss of fluid in the brake system is immediately made up after the braking operation by the introduction of fresh fluid under pressure. It is thus impossible for detrimental air spaces to form in the brake system. The initial tension in the system is thus always constant, so that the outside air finds no opportunity to enter the system. The most important feature is that the auxiliary pump performs its function, even when the vehicle is out of operation for a long time. The compressed spring 10 will then force more fluid into the main cylinder if any loss of fluid occur. The arrangement of the rising tube 22' in the reservoir 14 has the advantage that the air bubbles, which are forced into the return passage 22 out of the main cylinder 1 when the excess fluid flows back to the reservoir 14, will be separated when the fluid flows over the edge of the upper end of the rising tube, that is at the highest point of the reservoir. This prevents the air bubbles being drawn into the pressure space 7' of the pump 7 when fluid is drawn out of the reservoir 14 and passing from the pump into the main cylinder 1.

Figure 2:
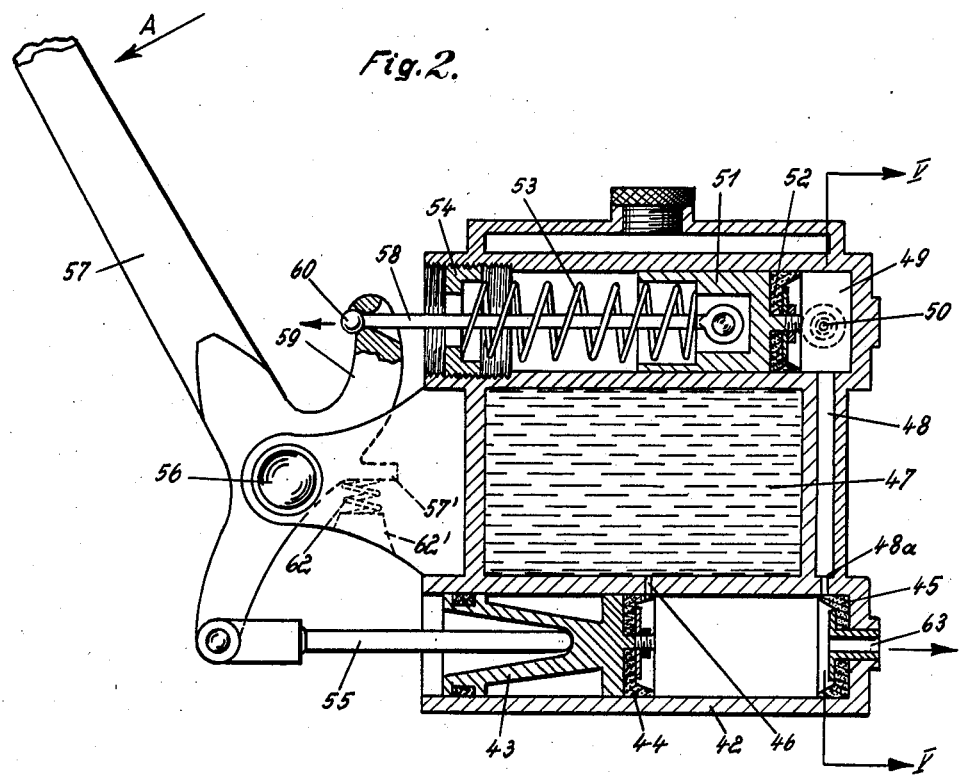
Fig. 2 shows the second construction of the main brake cylinder with the auxiliary pump also in section.
Figure 3:
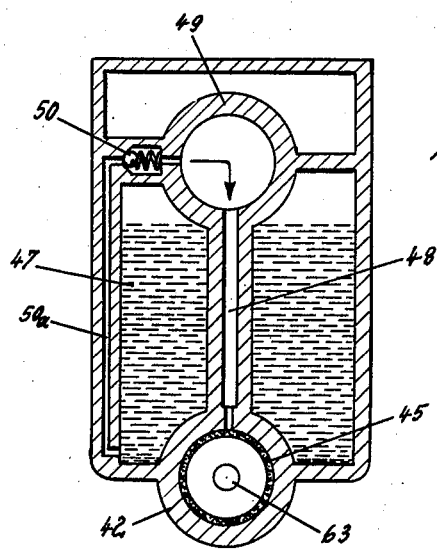
Fig. 3 is a vertical section on the line V—V of the construction in Fig. 2.

In Figs. 2 and 3 a second construction according to the invention is shown, in which the main brake cylinder 42 and the pressure cylinder 49 of the auxiliary pump are arranged horizontally one above the other. The reservoir 47 is placed between the two cylinders. The main brake cylinder 42 with the pressure piston 43 movable therein and the packing sleeve 44 form the lower part. At the outlet end of the main brake cylinder there is likewise provided a packing sleeve 45 with central opening. In the initial position of the piston 43 the packing sleeve 44 in front of it covers with its resilient lip-shaped edge the fine lateral opening 46 in the main brake cylinder, which forms a connection between the main cylinder and the reservoir 47. The other packing sleeve 45 closes with its yielding edge the lateral hole 48a near the outlet end 63 of the main brake cylinder which leads through the adjoining passage 48 to the refilling cylinder 49 placed above the reservoir 47. In the refilling cylinder, which communicates with the reservoir 47 through the suction passage 50a and the suction valve 50, 51 is the delivery member for the refilling fluid in the form of a piston having at its working end a packing sleeve 52. The piston 51 is acted upon by a return spring 53 engaging with its rear side the tension of which can be adjusted to the desired value by means of the adjustable abutment (screw member) 54. The piston 43 of the cylinder 42 is driven through the thrust rod 55 by the brake lever 57, which moves in the direction of the arrow A about the pivot point 56. On the brake lever there is a lug 59 for driving the connecting rod 58 which actuates the refilling piston 51 in the suction direction. The connection between the rod 58 and the driver 59 is such, that the connecting rod, or the brake lever, is only able to drive the refilling piston in the suction stroke direction, while the return movement of the piston 51 is effected independently of these driving elements. For this purpose the connecting rod 58 has a ball head 60 at the end nearer to the brake lever, while in the other direction there is no engagement point on the connecting rod for the driver 59, so that the connecting rod 58, and thereby the piston 51 of the refilling pump, can only be driven by the brake lever 57 in the direction of the arrow. The pedal 57 in the off-position rests with the part 57' against a resilient stop, which is formed for example by the spring 62, which is mounted in the eye 62'.

This braking device operates as follows:

When the brake lever 57 is moved in the direction of the arrow A the piston 43 is moved forward in the cylinder 42 in the direction of the outlet 63. It then forces the fluid in front of it into the pressure conduit (not illustrated), and further, into the wheel brake cylinders. The resilient edge of the sleeve 45 bears firmly against the opening 48a so that this is tightly closed from the cylinder 42. During the forward movement of the piston 43 the piston 51, in the cylinder 49, is drawn backwards by the driver 59 on the brake lever, that is in the direction of the brake lever, and thereby draws fluid from the reservoir 47 through the passage 50a and the suction valve 50 into the refilling cylinder 49. As soon as the brake lever 52 is released, the piston 51, under the influence of the compressed spring 53, forces the fluid in front of it through the passage 48 and the opening 48a into the pressure space of the cylinder 42, simultaneously forcing back the edge of the sleeve 45. The excess fluid forced into this pressure space is returned to the reservoir 47 through the opening 46, which is opened by the sleeve 44, when the initial pressure in the brake system is exceeded on account of the yielding of the piston 43. The yielding of the piston 43 beyond its normal rest position is made possible by the resilient brake lever stop 62.

In this brake arrangement a separate return spring for the brake lever or the main pressure piston may be dispensed with. The taking off of the brakes is effected apart from the brake block springs by the strong back pressure of the fluid, which is produced by means of the return spring 53 acting on the rear side of the refilling piston 51.

If it is desired that the refilling piston 51 should draw in a considerable quantity of refilling fluid after the brake lever 57 has moved only a small distance, the refilling cylinder 49 is preferably constructed with a greater diameter than the cylinder 42.

The arrangement of the reservoir 47 in Figs. 2 and 3, between the main pressure and the auxiliary cylinders, makes it possible to construct a brake system which is comparatively small and takes up little room and is therefore easily accommodated.

In Fig. 4 a third constructional form of the invention is illustrated. In this case the main brake cylinder 42 and the auxiliary cylinder 49, which may both be constructed as in Fig. 2, are arranged horizontally side by side. The operation of this form of the invention is similar to that described hereinbefore relating to Figs. 1 to 3. The reservoir 47 is again placed between the two cylinders. With this arrangement a low unit is obtained. In the cylinder 42, which forms the main brake cylinder, is the pressure piston 43. The cylinder 49 contains the piston 51 and forms the refilling pump. The two pistons are driven in opposite directions in accordance with the invention. The piston 43 in the main cylinder is connected through the piston rod 55 with the brake pedal 57, which is rotatably mounted on the coupling shaft 73 and to which the piston rod is pivoted at 65. The piston 51 of the refilling pump is engaged by the rod 58, constructed preferably of wire, and pivoted to the driving member 66, which is in the form of a double lever. The double lever 66 is mounted in the holder 68 so as to be rotatable about the pin 69 which is arranged in a vertical plane. The holder 68 consists of a fork head with a short threaded extension 70 (see Figures 5a and 5b), which is screwed into the end wall of the cylinder block between the two cylinders 42, 49. The threaded hole lies between the two cylinders 42, 49. The arm of the double lever 66 which is further from the rod 58 of the refilling pump is connected with the piston rod 55 of the main pressure device so as to be caused to move therewith in the direction of the braking stroke, the double lever being driven by a stop in the piston rod 55. The driven lever arm lies either as shown in Fig. 6 in an aperture (longitudinal slot) 71 of the piston rod 55 or the lever arm is forked at its free end and engages over the piston rod 55, as shown in Fig. 7. The stop on the piston rod 55, which effects the driving of the swinging lever 66, is formed in Fig. 6 by a roller 72 mounted in the slot 71. In Fig. 7, on the other hand, two rollers 72 are provided on the outer side of the piston rod 55. When the brake pedal is depressed, one arm of the swinging lever bears against this roller, or rollers, so as to be driven by the piston rod 55 and thereby turned about the vertical pin 69 in the holder 68. In view of the fact that when the piston 43 is forced into the cylinder 42, the piston rod 55 is moved a certain distance out of the horizontal plane, which would result in a seizing of the lever 66 in the slot 71 of the piston rod 55 or of the latter in the forked arm of the swinging lever (Fig. 7), the holder 68 is readily rotatable about its threaded axle, the threaded pin according to Fig. 4 on the holder not being completely screwed into the threaded hole. In this way the lever 66 is able to follow the movement of the piston rod 55 in the vertical plane when the brakes are applied, so that there is no seizing between the said parts.

The braking arrangement in Fig. 4 is further arranged in such a manner that the refilling pump or its driven member 66, can also be actuated independently of the brake lever 57. The horizontally mounted swinging lever is extended beyond the piston rod 55. This extended end of the free arm of the swinging lever co-operates with a cam-like driver 74 which is fixed on the coupling shaft 73 beside the brake pedal 57. By depressing the coupling pedal 75, which is keyed or otherwise secured on the outer end of the shaft 73, the cam 74 is caused to bear against the lever 66 and rotates the latter about the pin 69, at the same time driving the piston 51 of the refilling pump. Preferably the outer end of the extended lever arm is of round cross-section so that a pulley or roller 76 may be mounted thereon.

The arrangement described acts as follows:

When the pedal 57 is depressed the piston rod 55 and consequently the piston 43, are moved further into the interior of the cylinder 42. The piston rod 55 drives the lever 66, which bears against the roller 72 (Fig. 6) or against the two external rollers (Fig. 7) of the piston rod 55. The lever 66 is rotated about the pin 69 in the holder 68. The arm of the swinging lever connected with the piston rod 58 draws the piston 51 of the pump out of the interior of the cylinder 49 a distance corresponding to the swinging movement of the pedal 57. The pump thereby draws fluid out of the receiver 47. When the brake pedal 57 is released the piston 51 of the pump, by means of a stressed compressed spring or the like (compare Fig. 2), forces the previously drawn-in fluid through a pressure valve or the like, which is not shown in the fluid pressure system. The quantity of fluid exceeding the amount required for refilling passes through a return valve back to the reservoir 47.

If, on the other hand, the clutch pedal 75 is depressed, the shaft 73 mounted in the clutch casing S rotates, driving the cam 74. The brake pedal 57, which is mounted loosely on this shaft, remains in its original position. The cam 74 bears against the roller 76 and thereby against the long arm of the lever 66, which again is swung about the pin 69 and drives the piston 51 of the refilling pump. The piston 43 in the main brake cylinder 42 remains in its initial position since the swinging lever 66 when moving towards the cylinder block finds no abutment on the piston rod 55.

In this way the refilling pump is driven automatically whenever the driver works the clutch or brakes. It is thus always certain that the fluid pressure system will be filled and that the necessary initial pressure in the brakes will be available. In other words a braking arrangement is available which is always completely ready for use and reliable.

The lever 66 actuating the refilling pump may naturally also be connected with another driving member. For example a cord 77 or the like could engage with one long arm of the lever, which would be connected with any moving part of the vehicle, which would then actuate the refilling pump in the manner described independently of the operation of the brakes.

In case it is impossible for reasons of space to extend the horizontally mounted lever 66 beyond the piston rod 55, the refilling pump can also be driven independently of the operation of the brake by the rod 58, being connected to another driving member.

The constructional examples described have shown that the invention can be carried into effect in numerous ways and does not involve any particular construction and arrangement of the various parts of the brake pressure system. The only essential feature is that in the braking operation a sufficient quantity of fluid is drawn out of the receiver, which when the brakes are released, is forced under pressure into the brake pressure system, while the excess quantity of fluid determined by the initial pressure in the circuit can flow away from the circuit again through an overflow valve or similar device. In this way there is obtained complete certainty that the brake system is always filled with the necessary amount of fluid and that any changes of volume due to leakage, drop in temperature and so forth, are always immediately compensated. Fluid will also flow out of the brake system through the overflow valve if the pressure in the system should rise owing to external temperature influences or for other reasons.

What I claim is:

1. A hydraulic brake system for vehicles of any type, including a main cylinder, a piston slidable therein, means for operating said piston, a re-filling pump communicating with the main cylinder, a spring-loaded piston within said pump and flexible tension means connecting said spring-loaded piston to the brake lever of the vehicle, said spring-loaded piston acting to inject fluid into the main cylinder when the brakes are released.

2. A hydraulic brake system, including a main cylinder, a piston slidable therein, means for driving said piston, a reservoir, a re-filling pump, a positively driven spring-loaded piston therein, a conduit between said pump and said cylinder, inlet valve means between said conduit and cylinder, a conduit connecting the cylinder to the reservoir and outlet valve means between said cylinder and said second mentioned conduit.

3. A hydraulic brake system, including a main cylinder, a piston therein, means for driving the piston, a reservoir, a re-filling pump, a positively driven spring-loaded piston therein, a conduit between said pump and said cylinder, inlet valve means between said conduit and said cylinder, said cylinder having an aperture in its wall communicating with said reservoir, means on said cylinder piston for covering said aperture, and a resilient stop for said cylinder piston driving means.

4. A hydraulic brake system, including a horizontally arranged main cylinder, a piston therein, a horizontally arranged re-filling pump, a spring-loaded piston therein, and a horizontal swingable two armed lever for operating both pistons.

5. A hydraulic brake system, including a horizontally arranged main cylinder, a piston therein, a horizontally arranged re-filling pump, a spring-loaded piston therein, a two-armed lever for operating both pistons and relatively stationary supporting means for said lever.

6. A hydraulic brake system for vehicles of any type, including a main cylinder, a piston slidable therein, means for operating said piston, a refilling pump communicating with said main cylinder, a spring loaded piston within said pump and means connecting said spring-loaded piston to the clutch lever of the vehicle, said spring loaded piston acting to inject fluid into the main cylinder when the clutch and brakes are released.

HERMANN KURT WEIHE.